United States Patent [19]

Griffin

[11] Patent Number: 4,650,147

[45] Date of Patent: Mar. 17, 1987

[54] FLAGSTAFF FOR ALTERNATIVE USES

[76] Inventor: John C. Griffin, 550 Rock Springs Rd., Lancaster, S.C. 29720

[21] Appl. No.: 764,334

[22] Filed: Aug. 12, 1985

[51] Int. Cl.$^4$ .............................................. B60Q 1/32
[52] U.S. Cl. .................................... 248/539; 248/497; 116/28 R
[58] Field of Search .............. 248/539, 497; 116/28 R

[56] References Cited

U.S. PATENT DOCUMENTS

| | | | |
|---|---|---|---|
| 2,641,427 | 6/1953 | Krogh | 248/497 |
| 3,036,545 | 5/1962 | Legg | 248/539 |
| 3,870,259 | 3/1975 | Reynolds | 248/539 |
| 4,114,160 | 9/1978 | Verini | 248/539 |
| 4,163,426 | 8/1979 | O'Neill | 116/28 R |
| 4,348,978 | 9/1982 | Brucato | 116/28 R |
| 4,519,153 | 5/1985 | Moon | 116/28 R |

Primary Examiner—Reinaldo P. Machado

[57] ABSTRACT

A flagstaff for alternative uses includes an elongated pole with fasteners for attaching a flag to the pole and a bracket for use in selectively attaching the flag to an automotive vehicle. The bracket has a flange to fit about the upper edge of an automobile window and a latch which positively locks the pole to the bracket when operatively connected. The bracket also has a notch to fit about a nail or other fastener on a wall. Alternatively the pole may be removed from the bracket and carried by hand.

4 Claims, 12 Drawing Figures

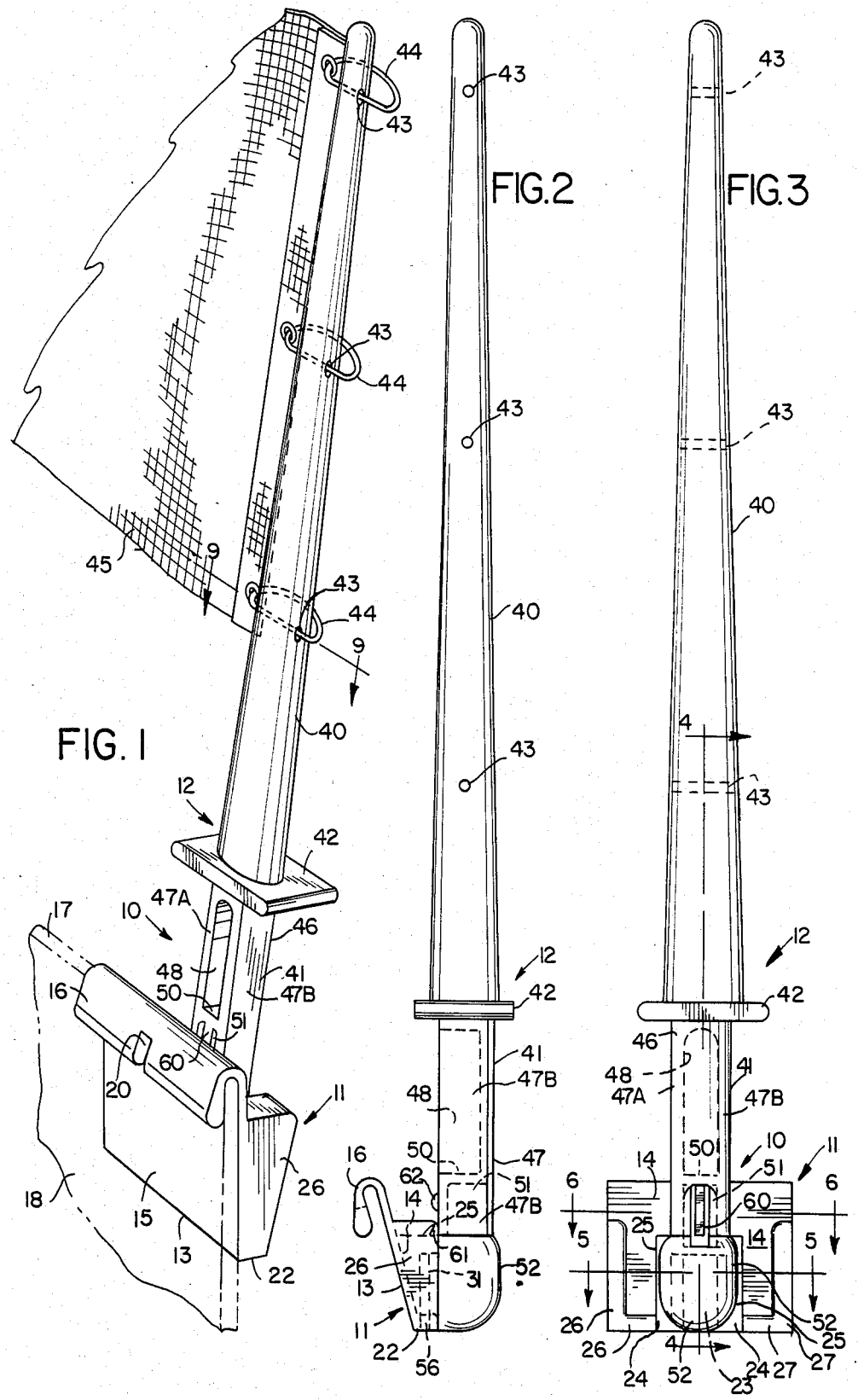

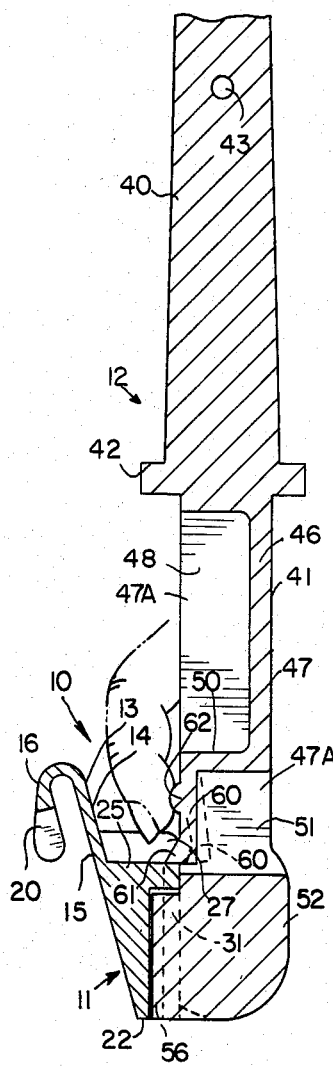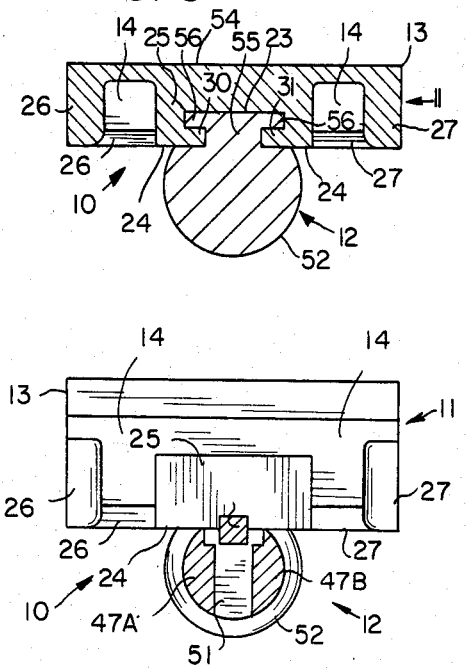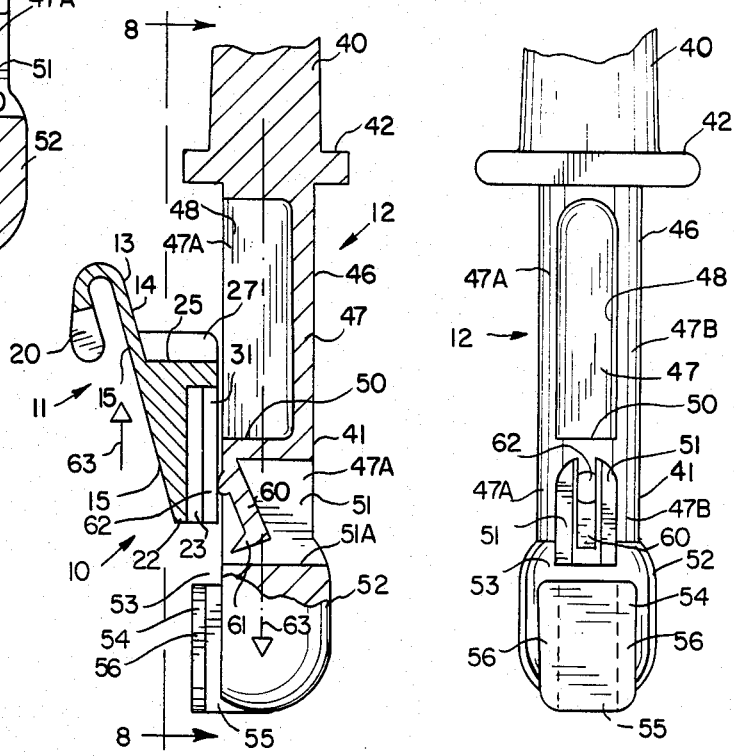

FLAGSTAFF FOR ALTERNATIVE USES

BACKGROUND OF THE INVENTION

This invention relates to flagstaffs for automotive use, and more specifically to a flagstaff supporting a small flag displaying a school emblem or colors and supported above the automobile from a side window, even as the automobile is driven. Alternatively, the flagstaff and its flag may be suspended from a nail partially driven in a wall, or carried by hand.

Flagstaffs supported by a side window of an automobile are known in the prior art. See, for example, U.S. Pat. No. 4,519,153 issued May 28, 1985 to Joseph C. Moon for Display Device. Other patents illustrating the use of an automobile window for supporting a display device include U.S. Pat. No. 4,348,978 issued Sept. 14, 1982 to George C. Brucato for Auta-help, U.S. Pat. No. 4,163,426 issued Aug. 7, 1979 to Donald C. O'Neill for Highway Safety Device, U.S. Pat. No. 4,015,557 issued Apr. 5, 1977 to Joseph Schulein for Vehicle Display Assembly, and U.S. Pat. No. 2,398,748 issued Apr. 16, 1946 to Morris Lange, et al. for Flagstaff Support.

The aforesaid patents to Schulein, O'Neill and Brucato disclose devices intended to display a flag while the automobile is stopped because of mechanical trouble, an accident, or out of gas. There is no need for retaining the flag or signal on the car while it is being driven and these patents do not disclose any apparatus for dealing with that problem.

The Lange patent discloses a flagstaff support for use while the vehicle is being driven in a parade or funeral, and therefore at slow speeds. Lange discloses a flexible support which may be flexed into frictional engagement with a window opening. Such an arrangement may be satisfactory for supporting a flag at the slow speeds of a parade or funeral, but it would not be satisfactory to support a flag while the car is being driven at highway speeds or, perhaps, even normal city speeds.

The Moon patent discloses a flagstaff intended for the same purpose as the present invention, namely, supporting a flag while the car is being driven at speeds ranging up to highway speed. Moon discloses a flagstaff supported in a bracket which includes a U-shaped portion extending about the upper edge of an automobile window preparatory to raising the window to clamp the U-shaped portion of the bracket between the window glass and the top of the window frame on an automobile. The flagstaff of Moon is removably supported in the bracket by providing a bifurcated lower end portion on the flagpole and a vertical passageway through the bracket to receive the bifurcated end portion of the flagstaff. The bifurcated end portion includes an annular ridge which is passed completely through the vertical passage in the bracket so that the ridge seats against the lower surface of the bracket to resist removal of the flagstaff from the bracket. The flagstaff of Moon may be removed from the bracket by pressing together the bifurcated end portions to reduce the diameter of the annular ridge and then pull the ridge upwardly through the vertical opening in the socket.

The attachment of a flag to the flagstaff of Moon creates a lot of pressure on the flagstaff when the vehicle to which it is attached is driven at high speeds. There is a danger of such pressures overcoming the frictional engagement of the flagstaff with the bracket and pulling the flagstaff out of the bracket while the car is driven at high speed.

The flagstaff of Moon is readily removable from its bracket by pressing together the bifurcated end portion and raising the flagstaff from the bracket. This may be tempting to enthusiastic students at a school event such as a football game or the like resulting in loss of the flagstaff and its flag through vandalism or theft.

SUMMARY OF THE INVENTION

The present invention comprises a bracket including a U-shaped portion which fits about the upper edge of an automobile window and may be clamped between the upper edge of the window glass and the top of the window frame, as in the prior art. According to the present invention, a flagstaff is mechanically locked to the bracket supported by the window glass to eliminate the risk of the flagstaff being undesirably removed from the bracket during high speed operation of the automobile.

It is an object of the invention to provide a flagstaff for automotive use comprising a bracket positively but removably fixed to an automobile, a flagstaff, a flag connected to the flagstaff, and means for positively but removably locking the flagstaff to the bracket.

It is a more specific object of this invention to provide a device of the type described wherein said means for positively but removably locking the flagstaff to the bracket include a keyway on the bracket and a corresponding flange on the flagstaff, whereby the flange on the flagstaff may be engaged with the keyway on the bracket to removably connect the flagstaff to the bracket.

A more specific object of the invention is to provide a device of the type described wherein the keyway on the bracket opens downwardly and is closed at its top, whereby the flanged flagstaff is moved upwardly in the keyway to connect the flagstaff to the bracket and the flanged flagstaff is moved downwardly from the bracket to disconnect the flagstaff from the bracket, whereby the flagstaff is locked to the bracket against the tendency of wind encountered in high speed driving to lift the flagstaff upwardly and away from the bracket.

A further object of the invention is to provide a lock on the flagstaff spaced from the flange on the flagstaff sufficiently to engage the closed end of the keyway on the bracket when the flange on the flagstaff is fully seated in the keyway on the bracket.

A still further object of the invention is to provide a device of the type last described wherein said lock is displaceable to permit the flagstaff to be removed from the bracket.

Some of the objects of the invention having been stated, other objects will appear to those skilled in the art from the following description when taken in connection with the accompanying drawings.

BRIEF DESCRIPTION OF THE DRAWINGS

FIG. 1 is a perspective view, with parts broken away, illustrating a flagstaff seated in a bracket supported from the upper edge of an automobile window;

FIG. 2 is a side elevation of the flagstaff and bracket shown in FIG. 1 but removed from the window;

FIG. 3 is a front elevation of the flagstaff and bracket;

FIG. 4 is a sectional view taken substantially along the line 4—4 in FIG. 3 and illustrating manual manipulation of a lock on the base of the flagstaff to release the flagstaff from the bracket;

FIG. 5 is a sectional view taken substantially along the line 5—5 in FIG. 3;

FIG. 6 is a sectional view taken substantially along the line 6—6 in FIG. 3;

FIG. 7 is a sectional view, with parts broken away, similar to FIG. 4 but illustrating removal of the flagstaff from the bracket after the lock on the flagstaff has been manipulated to disengage it from the bracket;

FIG. 8 is a rear elevation of the base of the flagstaff, with parts broken away, looking in the direction of the arrows 8—8 in FIG. 7 showing the base of the flagstaff removed from the bracket;

FIG. 11 is a side elevation partially in section and with parts broken away illustrating an alternative attachment of the flagstaff and bracket to a nail extending from a wall or the like.

DETAILED DESCRIPTION OF THE INVENTION

Referring more specifically to the drawings, a composite flagstaff and bracket is broadly indicated at 10, the bracket is broadly indicated at 11 and the flagstaff is broadly indicated at 12.

THE BRACKET

Figure 11:
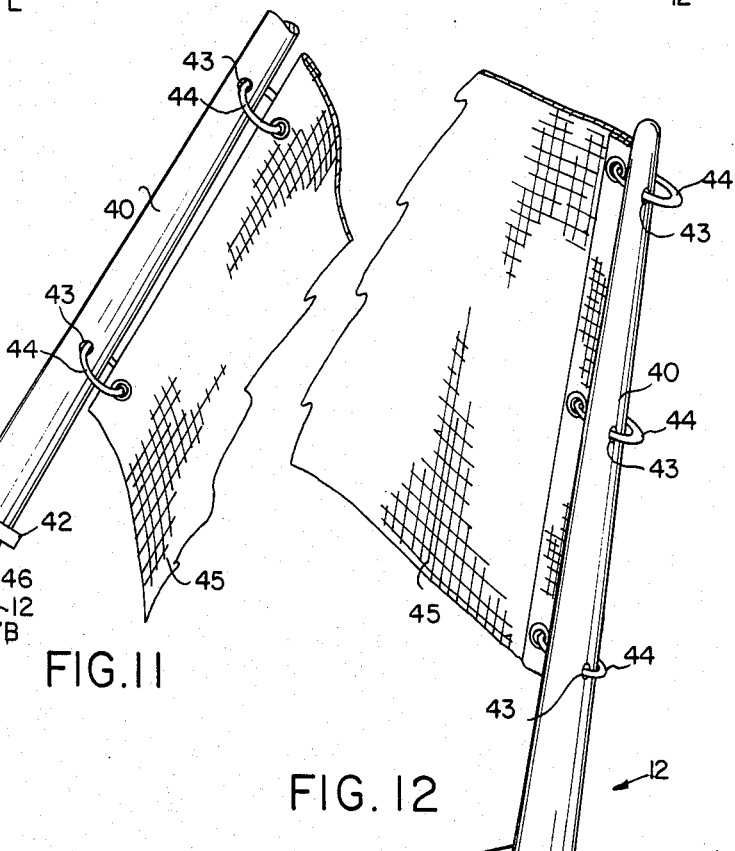

The bracket 11 removably supports the flagstaff 12 in selected environment and is preferably molded from plastic bracket 11 comprises a base 13 of planar configuration including a front wall 14 and a rear wall 15. An upwardly extending inverted U-shaped portion 16 rises from the base 13 to be mounted over the upper edge 17 of a vertically reciprocal 18. The free end of the U-shaped portion 16 has a centrally located slot 20 to receive a fastener such as a nail 21 or the like extending from a stationary supporting surface, such as a wall W (FIG. 11).

For use in supporting the flagstaff 12, the automobile window 21. The base 13 has a bottom wall 22 opposite the inverted U-shaped portion 16 and a centrally located vertically extending keyway 23 (FIG. 7) communicates with the bottom wall 22 and extends upwardly therefrom at an angle relative to the base 13. The keyway 23 is recessed from the front wall 24 of a block 25 (FIGS. 5 and 6) formed integral with and extending forwardly from the front wall 14 of base 13. L-shaped reenforcing ribs 26 and 27 merge with opposite sides of the block 25 as viewed, for example, in FIG. 3 and extend upwardly along the sides of front wall 14 of base 13.

As most clearly seen in FIG. 5, the keyway 23 is defined by flanges 30 and 31 formed in the front wall 24 of block 25 and extending toward each other. The flanges 30, 31 terminate in spaced relation from each other across the front of the keyway 23.

THE FLAGSTAFF

The flagstaff 12 is preferably molded from plastic and comprises an elongated pole or flag supporting portion 40 and a butt or handle portion 41 formed integral with the pole 40 but separated therefrom by an integrally formed guard or hilt 42. The pole 40 has a plurality of bores or passageways 43 extending therethrough in a direction parallel with the path of travel of an automobile for reception of a length of cordage or plastic to serve as a connector or retainer 44 for a flag 45.

Figure 9:
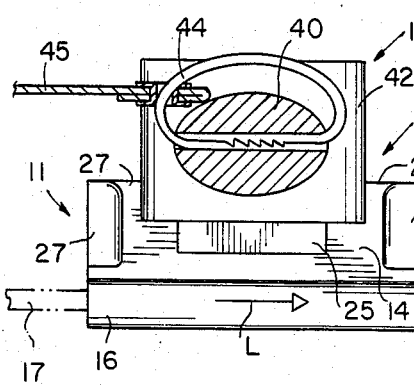
FIG. 9 is a sectional view, mostly in elevation and with parts broken away, taken substantially along the line 9—9 in FIG. 1 and illustrating the attachment of a flag to the flagstaff and the attachment of the flagstaff and bracket to a window on the left side of an automobile.
Figure 10:
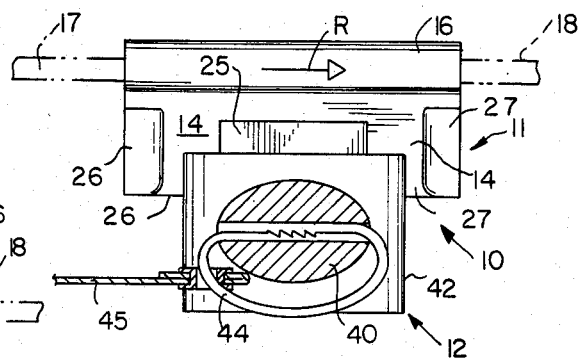
FIG. 10 is a sectional vies similar to FIG. 9 and illustrating the attachment of the flagstaff and bracket to a window on the right side of an automobile.

Without the flag, the flagstaff is intended to simulate a short sword. The flagstaff can be effectively attached to a window on the left side of an automobile moving in the direction of the arrow L in FIG. 9 or to a window on the right side of an automobile moving in the same direction, as indicated by the arrow R in FIG. 10.

The butt or handle portion 41 includes a hand grip 46 which may, for economy of manufacture, be defined by a generally U-shaped wall 47 formed integral with the pole 40 and hilt 42 and extending about a cavity 48 in the hand grip 46. The lower end of the cavity 48 is formed by a wall 50 extending between opposite sides of the U-shaped wall 47 in spaced parallel relation beneath the hilt 42. Opposed side walls 47, 48 of the U-shaped wall 47 extend downwardly beyond the end wall 50 of cavity 48 in spaced relation to each other to define the sides of a second cavity or opening 51 therebetween beneath the wall 50. The sidewalls 47A, 47b terminate in merged relation with a generally bulbous terminal portion 52. The lower end of cavity 51 in the drawings is defined by a wall 51A adjacent the merger of sidewalls 47A and 47B with terminal portion 51 (FIG. 7). The rear surface 53 of terminal portion 52 is flattened and a flanged portion 54 projects rearwardly from the flattened surface 53 of terminal portion 52. The flanged portion 54 comprises a stem 55 formed integral with the terminal portion 52 and extending upwardly from the free end of terminal portion 52 along the central portion of flattened rear surface 53, terminating in spaced relation below the lower end wall 51A of opening 51. Flanges 56 project laterally from the stem 55.

The stem 55 and flanges 56 are shaped and dimensioned to latchingly engage the keyway 23 in the bracket 11 with the flanges 30, 31 on the bracket engaging the flanges 56 on the flagstaff to retain the flagstaff in the bracket.

The flagstaff is attached to the bracket by positioning the flanged portion 54 on the bottom of the flagstaff beneath the bracket 11 and with the flanges 56 aligned with the keyway 23 in bracket 11 as shown in FIG. 7. The flanged portion 54 of the flagstaff and bracket are then moved together (opposite the directions indicated by the arrows 57 in FIG. 7) then moved to engage the flanges 56 with the keyway 23 in the manner described and shown in FIGS. 1-6.

A flexible latch 60 depends from the rear edge of wall 50 substantially across opening 51, terminating in spaced relation to wall 51A. The lower end portion of latch 60 flares rearwardly to define a keeper 61 movable into overlying relation with the block 25 on the bracket 11 in assembled relation (FIGS. 4 and 6). A protuberance or button 62 projects rearwardly from the medial portion of latch 60 for manual engagement when it is desired to remove the flagstaff from the bracket (FIG. 4). Engagement of the protuberance 62 as shown in FIG. 4 moves the latch 60 from its solid line position to the dotted line position of FIG. 4 within the opening 51.

The keeper on the flagstaff is thereby removed from engagement with the block on the bracket enabling the flagstaff and bracket to be moved in the direction of the arrows 57 in FIG. 7 to separate the flagstaff from the bracket.

Figure 12:
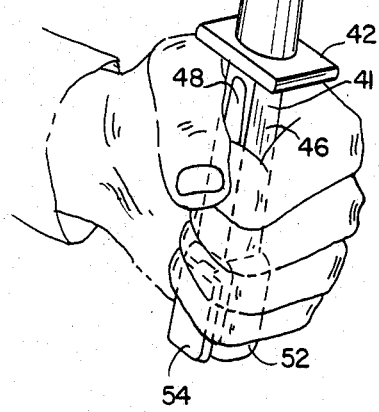
FIG. 12 is a perspective view of the flagstaff and bracket, and showing it hand carried.

The bracket 11 may remain with the automobile while the user carries the flag by grasping the handle 46 of flagstaff 12 as shown in FIG. 12.

There is thus provided a flagstaff and bracket which may be alternatively and effectively used to display a flag from an automobile being driven at high speeds, or mounted on a stationary support such as the wall of a college dormitory. If desired, the flagstaff may be removed from the bracket and manually grasped by the handle to display the flag.

Although specific terms have been employed in describing the invention, they have been used in a descriptive and generic sense only and not for purposes of limitation.

I claim:

1. A flagstaff for automotive use comprising an elongated flag supporting portion, means for attaching a flag to the flag supporting portion, a handle extending from the lower end of the flag supporting portion and including a free end, a flanged portion projecting laterally from the free end of the handle, a bracket, said bracket including means for attachment to an automobile, a keyway in the bracket for receiving the flanged portion on the handle of the flagstaff, said keyway being closed at the top and open at the bottom, whereby the flagstaff is moved upwardly relative to the bracket to engage the flanged portion on the flagstaff with the keyway in the bracket and the flagstaff is moved downwardly relative to the bracket to remove the flanged portion from the keyway.

2. A structure according to claim 1 wherein a flexible latch is spaced above the flanged portion on the handle of the flagstaff and normally projecting outwardly beyond the flanged portion, a block above the keyway on the bracket, and said latch engaging said block when the flanged portion on the flagstaff is fully seated in the keyway on the bracket.

3. Means for supporting a flag on an automobile, said means comprising an elongated flagstaff having a lower end, a flanged portion protruding laterally from the lower end of the flagstaff, a bracket, said bracket including means for attachment to an automobile, a keyway in the bracket for receiving the flanged portion protruding from the lower end of the flagstaff, said keyway being closed at the top and open at the bottom, whereby the flagstaff is moved upwardly relative to the bracket to engage the flanged portion with the keyway in the bracket and the flagstaff is moved downwardly relative to the bracket to remove the flanged portion from the keyway and to thereby remove the flagstaff from the automobile.

4. A structure according to claim 3 wherein said means on the bracket for attachment to an automobile includes an upwardly extending inverted U-shaped portion for attachment about the upper edge of a vertically reciprocable automobile window, and said U-shaped portion having a slot communicating with its free edge, whereby the bracket and flagstaff may be alternatively supported on a fastener protruding from a stationary vertical supporting surface.

* * * * *